United States Patent
Cruz

(10) Patent No.: US 9,894,847 B2
(45) Date of Patent: Feb. 20, 2018

(54) PLANT FROST PROTECTION APPARATUS

(71) Applicant: Luis Cruz, Spring Hill, FL (US)

(72) Inventor: Luis Cruz, Spring Hill, FL (US)

(*) Notice: Subject to any disclaimer, the term of this patent is extended or adjusted under 35 U.S.C. 154(b) by 188 days.

(21) Appl. No.: 14/835,625

(22) Filed: Aug. 25, 2015

(65) Prior Publication Data

US 2017/0055462 A1    Mar. 2, 2017

(51) Int. Cl.
*A01G 13/06* (2006.01)
*A01G 13/04* (2006.01)

(52) U.S. Cl.
CPC .......... *A01G 13/06* (2013.01); *A01G 13/043* (2013.01)

(58) Field of Classification Search
CPC .............................. A01G 13/06; A01G 13/043
USPC ........................ 47/2, 23.1, 23.2, 23.3, 29.5
See application file for complete search history.

(56) References Cited

U.S. PATENT DOCUMENTS

| | | | | |
|---|---|---|---|---|
| 1,820,040 A * | 8/1931 | Zuckerman | .......... | A01G 13/043 383/116 |
| 2,006,562 A * | 7/1935 | Scheu | .......... | A01G 13/06 126/59.5 |
| 2,953,870 A * | 9/1960 | Nelson | .......... | A01G 13/043 135/87 |
| 7,637,053 B1 * | 12/2009 | McAnulty | .......... | A01G 9/24 47/23.1 |
| 8,881,449 B2 * | 11/2014 | Thery | .......... | A01G 9/242 454/250 |
| 2007/0220807 A1 * | 9/2007 | Marc | .......... | A01G 13/06 47/2 |

* cited by examiner

*Primary Examiner* — Monica L Williams
(74) *Attorney, Agent, or Firm* — Justin Luby

(57) ABSTRACT

An apparatus for protecting plants, trees, bushes, etc. from harsh environments when the ambient air temperature is below the lower tolerance limit for that species of plant. The apparatus consists of an envelope that covers the plant with a drawstring on the open end of the envelope that cinches around the base of the plant. Installed in envelope is a blower and heater that heats and circulates air throughout the envelope, creates a micro-environment within the envelope that is above the lower tolerance limit for that species of plant, keeping the plant from being harmed by the outside environment.

9 Claims, 5 Drawing Sheets

PLANT FROST PROTECTION APPARATUS

CROSS-REFERENCE TO RELATED APPLICATIONS

Not Applicable

FIELD OF THE INVENTION

The present invention relates to plant protection apparatus for planted or potted plants, more specifically but not by way of limitation a forced air heated plant cover operable to protect a variety of sizes of bushes, plants or trees from sustained environmental temperatures that are at or below the lower tolerance limit for that species of plant.

BACKGROUND

In subtropical climate regions, such as the southern region of the United States, freezing temperatures can cause significant damage to temperature sensitive plants. Oftentimes when temperature drop below zero homeowners are forced to replace shrubbery, bushes and other plants, as the local vegetation was unable to withstand the freezing temperatures.

One problem homeowners encounter is the lack of available products to assist in protecting their plants and trees. When inclement weather is predicted, many homeowners will utilize spare blankets or tarps as these are the only readily available items that can assist in attempting to protect their plants and trees. When utilizing conventional blankets or tarps, the home owner typically will use clamps, strings, or tape to secure the covering. Such methods are slow and labor intensive, and do not provide the necessary protection when the temperature drops below the lower temperature tolerance limit of the plant or tree for a sustained period of time.

Frequently during periods of inclement weather, the winds are increased which creates added problems. Conventional blankets or tarps typically do not have a means wherein the perimeter of the blanket or tarp can be secured to the plant or bush so as to substantially secure it to the plant, bush, or tree. This often results in the blanket or tarp being blown off the bush or tree that it was intended to insulate thus resulting in the damage or loss of the plant, bush, or tree.

Accordingly, there is a need for an apparatus that is operable to protect plant or trees from inclement weather wherein the apparatus is operable to maintain a temperatures immediate proximate the plant or tree that it is superposed at a level that is at or greater than the lower temperature tolerance limit of the plant or tree for a sustained period of time.

Additionally, there is a need for an apparatus that is operable to protect plant or trees from inclement weather wherein the apparatus can be simply and effectively secured to the plant or bush so that the apparatus cannot be blown off the bush or tree that it was intended to insulate.

SUMMARY

It is the object of the present invention to provide an apparatus that can be placed over a plant or tree wherein the apparatus is operable to maintain a temperature that is at or above the lowest temperature tolerance limit for the plant or tree in environments that the atmospheric temperature is at or below the lower tolerance limit of the plant or tree.

Another object of the present invention is to provide an apparatus that can be simply and securely installed on the base, trunk or pot of a bush, tree, or plant with minimal effort.

Yet a further object of the present invention is to provide an apparatus that can be reliably secured to the base, trunk or pot of a bush, tree, or plant that will remain in place in the event that winds are present in the environment.

Still another object of the present invention is to provide an apparatus that is operable to create a micro-environment for the plant that is maintained at a temperature that is greater than that of the outside environment.

The plant frost protection apparatus of the present invention includes a large envelope made of durable insulating material that has a cavity hemmed around the perimeter of the open end of the envelope. Running through the cavity is a drawstring that allows the tarp to be simply and securely cinched around the base, trunk, or planter for the bush, tree, or plant.

Integrated into the tarp is a blower and heating element. When the tarp is secured around the exterior of the plant and cinched at the base, the blower and heater will inflate the tarp with warm air, creating a micro-environment around the plant, protecting it from the harsh environment outside.

The present invention provides an improved plant protection apparatus over its predecessors because the inclusion of a drawstring in the perimeter of the tarp allow provides the user with a significantly quicker and simpler method to install an environmental barrier than would otherwise be achieved using tarp and more traditional methods of securing the tarp to the plant.

Additionally, the inclusion of a blower/heater into the apparatus will provide a more protective environment for the plant than traditional methods. Traditional methods of using a tarp to insulate the plant to protect it will not be effective if ambient temperature drops below a level where the insulation is unable to sustain the plant temperature above its lower tolerance limit.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

DETAILED DESCRIPTION OF THE INVENTION AND PREFERRED EMBODIMENT

Figure 1:
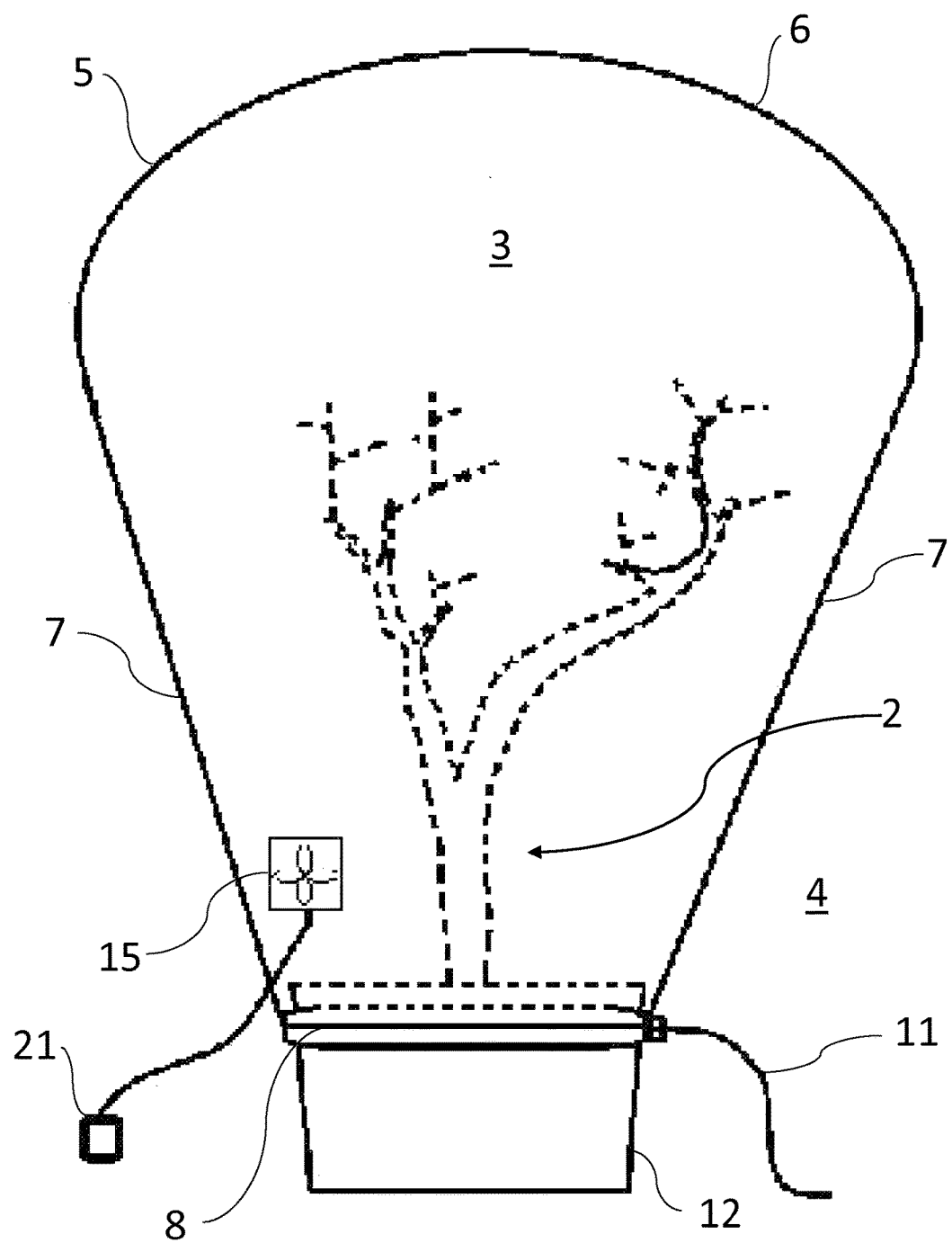
FIG. 1 illustrates a side view drawing of the plant frost protection apparatus installed over a potted plant.
Figure 2:
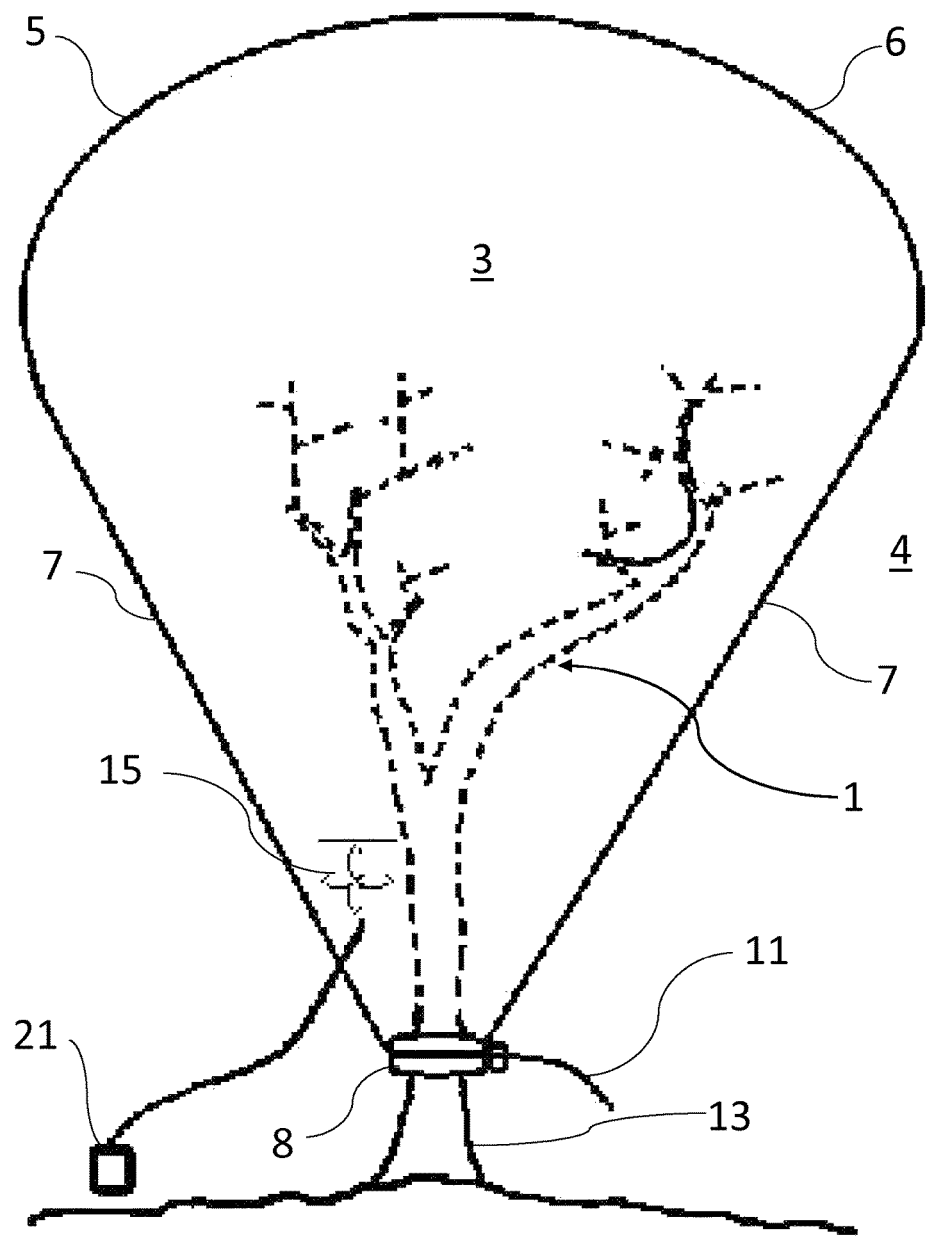
FIG. 2 illustrates a side view drawing of the plant frost protection apparatus installed over a plant planted in the ground.

As shown in FIGS. 1 & 2, the present invention provides a plant frost protection apparatus. As mentioned the plant frost protection apparatus is for protecting a both planted 1 and potted plants 2, (plants including both bushes and trees) from temperatures below their lower tolerance limits by creating a micro-environment 3 around the plant 1, 2, protecting it from the harsh environment outside 4.

The plant frost protection apparatus includes a envelop 5 that is manufactured from a durable, flexible material. The shape of the envelop can take a multitude of 3D shapes including but not limited to rectangular, ovular, rectangular, cubical, tubular, and spherical. The top 6 and sides 7 of the envelop need to be sealed and the bottom edge of the envelope is open 8 to allow the envelope 5 to be placed over the plant 1, 2 which it will be used to protect.

It is contemplated within the scope of the present invention that the envelope 5 can be manufactured in numerous different sizes in order to accommodate plants of various sizes.

While the envelope 5 can be manufactured of a multitude of materials, in the preferred embodiment of the invention material of the construction of the envelope is nylon. However, the envelope can be made of any materials that are weather resistant, capable of sustaining light wind forces, and tear resistant during the installation and removal process. Additionally, in the preferred embodiment the envelope 5 will also be insulating, UV resistant, mold resistant, and insect repelling coated.

Figure 3:
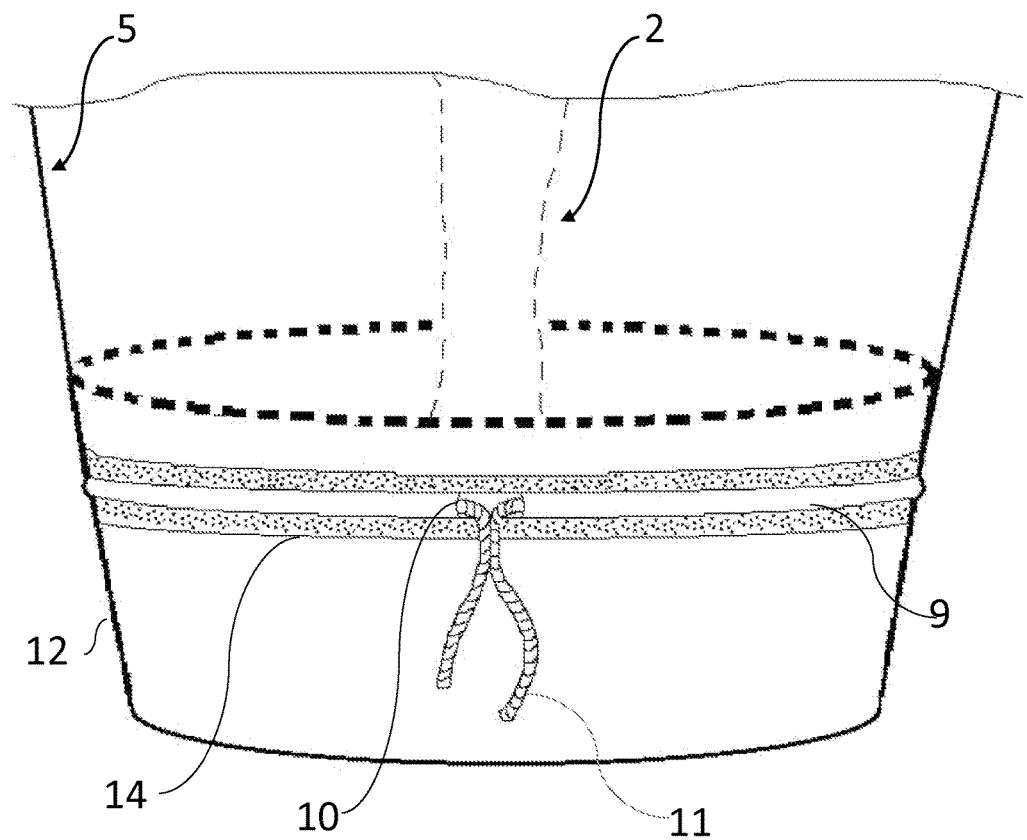
FIG. 3 illustrates a close-up detail of the drawstring tightened around a plant potter with the seal installed.

Referring to FIG. 3, along the open edge of the envelope 8 is a cavity 9 that has an opening 10 at either end of the cavity 9. In the preferred embodiment the cavity is formed by hemming the material along the open edge of the envelope 8, however, this cavity 9 can be formed by number of methods known to those skilled in the art, including but not limited to riveting, heat sealing, and adhesives.

Referring to FIG. 3, running through the cavity 9 around the open edge of the envelope 8 is a drawstring 11. The drawstring 11 allows the open end of the envelope 8 to be securely cinched around the planter 12 or the base or trunk of a planted plant 13. Being able to cinch the open end of the envelope around the planter 12 or the base or trunk of a planted plant 13 has several advantages. First, the cinching the open edge of the envelope 8 around the planter 12 or the base or trunk of a planted plant 13 reduces the ability of the cold air to infiltrate into the micro-environment 3, increasing the efficiency of the plant frost protection apparatus. Second, the cinching more securely attaches the envelope to the plant 1, 2, making it less susceptible to be blown off of the plant by heavy winds.

The method of restraining the drawstring 11 can be with a simple knot, or any other mechanical device known to those skilled in the art.

Referring to FIG. 3, in the preferred embodiment, when the envelope 5 is installed, it is preferred that an optional seal 14 be installed between the envelope drawstring cavity 9 and the planter 12 or the base or trunk of a planted plant 13. While not required to function, installing the seal will reduce air leakage from the micro-environment 3 from the cold outdoor weather, further increasing the efficiency of the plant frost protection apparatus.

In the preferred embodiment the seal 14 is made of a closed cell foam strap, however, the seal 14 could be manufactured from any materials known to those skilled in the art.

Figure 4:
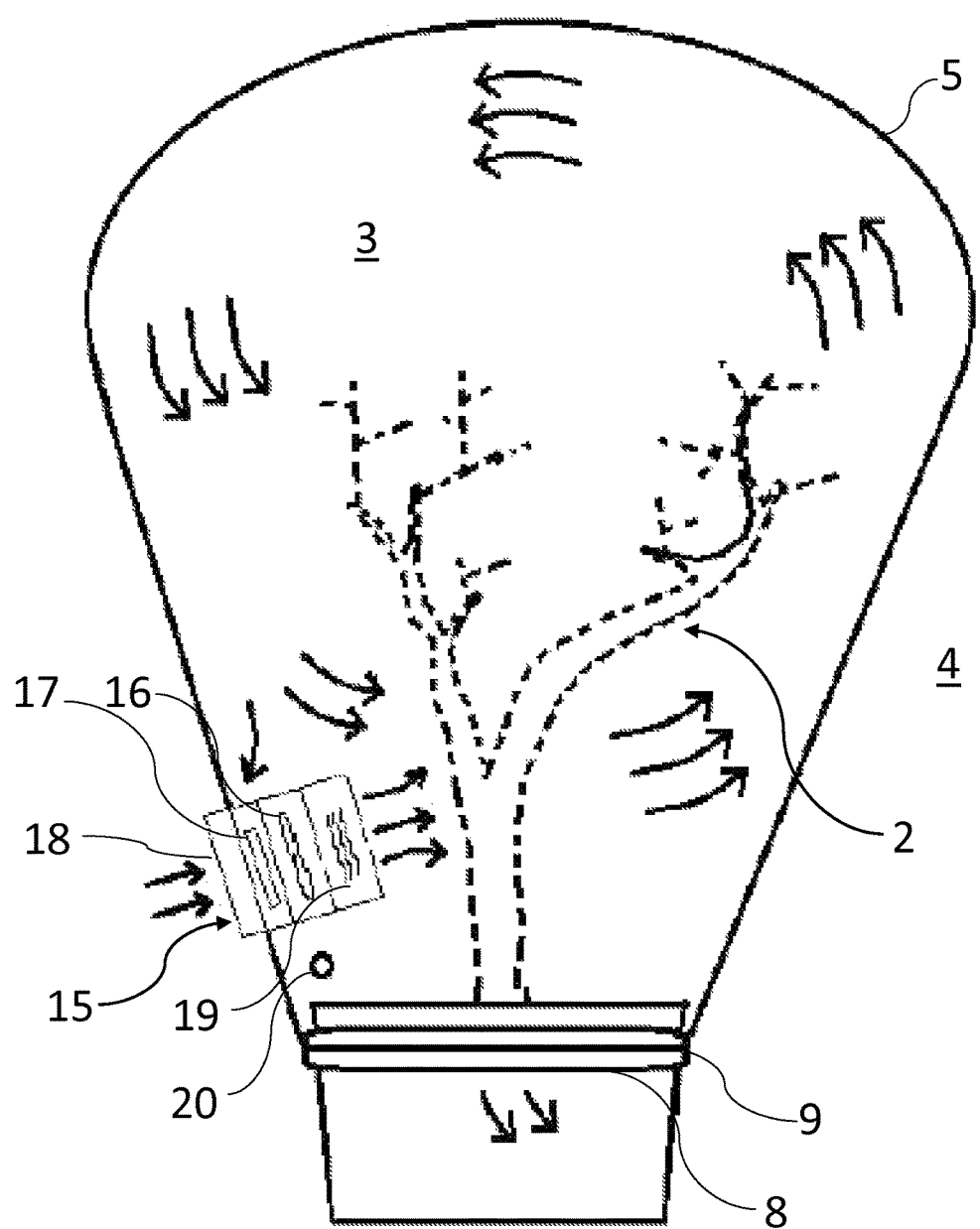
FIG. 4 illustrates an airflow diagram detailing the blower fan used in the apparatus, with a heating element.

Referring to FIG. 4, integrated into the envelope 5 is a blower 15. The blower 15 is used to force air into the envelope 5, inflating the envelope 5, providing air for the micro-environment 3. The blower 15 is installed in a cut-out section in the envelope 5, preferably near the bottom of the bottom of the envelope 5. The cut out section should be sized for the footprint of the blower 15, minimizing air leakage. The blower 15 can be installed in the cut out section in a number of manners known to those skilled in the art, including but not limited to clamping, riveting, and adhesives.

Referring to FIG. 4, in the preferred embodiment, the blower 15 used is an axial fan 16, with recirculating air intake 17 and fresh air intake 18. When installed, the recirculating air intake 17 is located within the micro-environment 3 and the fresh air intake 18 is located outside of the micro-environment. Referring to FIG. 4, the recirculating air intake 17 is used to circulate and mix air within the micro-environment 3 so that air temperature within micro-environment 3 is uniform. The fresh air intake 18 is necessary to make up for air leakage that will occur from the micro-environment to the outside environment. While preferred, the use of a recirculating intake 17 is not required, and could be replaced by a purely fresh air blower system. However, the usage of a recirculating intake 17 will improve air temperature uniformity throughout the micro-environment 3 and will minimize the amount of heat required to sustain the micro-environment 3.

In the preferred embodiment, the axial fan 16 is controlled by a speed controller to regulate the speed of the fan to an optimal minimal speed. While not required, use of the speed controller will minimize the amount of electricity required to operate the apparatus.

In addition to the blower, a heat source 19 is also required to maintain the temperature of the micro-environment 3 above the lower tolerance limits of the plants 1, 2 it is used to protect. Referring to FIG. 4 in the preferred embodiment, the heat source 19 is located at the exhaust of the blower 15. Locating the heat source 19 at the outlet of the blower 15 will increase heat transfer efficiency between the heating element and the air, and will better distribute temperature throughout the micro-environment 3. While not preferred, the heat source 19 could be placed in any number of locations in the environment provided that the heat source 19 did not get so hot as to injure the plant 1, 2 it is being used to protect.

In the preferred embodiment of the invention, referring to FIG. 4, a temperature sensor 20 will be placed in the micro-environment 3 to maintain the temperature above the lower tolerance limits of the plant(s) 1, 2 it is used to protect. While not required, using a temperature sensor 20 to regulate when to turn on and off the heat source 19 will allow the user to conserve significant amounts of energy. Without the use of the temperature sensor 20, either the heat source 19 would be required to run constantly, or it could be operated in a timer, turning on intermittently.

In the preferred embodiment of the invention the energy to operate the axial fan 16 and heat source 19 would be 110V power 21 or battery power (not shown), as these are the most common sources of energy available. However, these components could be powered by any method known to those skilled in the art.

Figure 5:
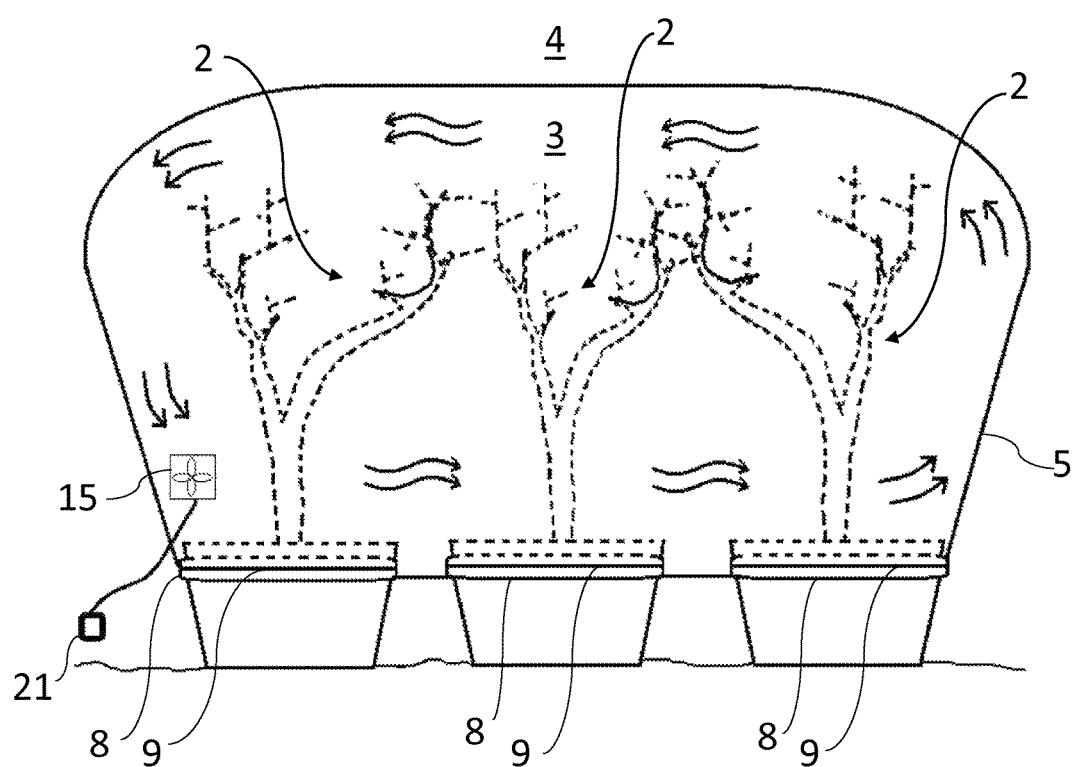
FIG. 5 illustrates an airflow diagram of the apparatus when in use with multiple plants.

Referring to FIG. 5, in an alternate embodiment of the invention, the apparatus could be designed with a plurality of envelope openings 8 and drawstrings 11. This would allow the apparatus to protect a multitude of plants 1, 2, while only requiring the use of one axial fan 16 and heater 19. This would provide the user with a significant savings in utility consumption, only needing to operate a single blower unit 15 unit to protect multiple plants 1, 2.

It would be appreciated by those skilled in the art that various changes and modifications can be made to the illustrated embodiments without departing from the spirit of the present invention. All such modifications and changes are intended to be covered by the appended claims.

What is claimed is:

1. A plant protection apparatus operable to provide a micro-environment immediately adjacent the plant wherein the temperature is greater than that of the temperature of the outside environment surroundings comprising:

An envelope with one or more properly sized openings to engulf one or more plants constructed of a durable, flexible material, incorporating a cavity with a drawstring around the openings of the envelope capable of securing the apparatus to the plant, either directly or indirectly;

A recirculating forced air heating system, said forced air heating system having an outside air inlet, drawing air from the outside environment into the envelop to inflate the envelope and maintain the envelope inflated, an inside air inlet, located within the envelope to draw air from within the micro-environment of the envelope to recirculate, a fan and a heating element located downstream of the outside air inlet and the inside air inlet, heating both air drawn through the outside air inlet and the inside air inlet thereby heating the air within the envelope to a temperature above that of the outside environment.

2. The plant protection apparatus as recited in claim 1, and further including a temperature sensor and control that maintains the temperature within the envelope to a set temperature.

3. The plant protection apparatus as recited in claim 1, wherein said envelope is manufactured from a material having a UV resistance.

4. The plant protection apparatus as recited in claim 1, wherein said envelope is manufactured from a material having mold resistance.

5. The plant protection apparatus as recited in claim 1, and further including a seal that is installed between the drawstring(s) and the plant(s) thereby minimizing leakage.

6. A plant protection apparatus operable to provide a micro-environment immediately adjacent the plant wherein the temperature is greater than that of the temperature of the outside environment surroundings comprising:

An envelope with one or more properly sized openings to engulf one or more plants constructed of a durable and flexible material, incorporating a cavity with a drawstring around the openings of the envelope capable of securing the apparatus to the plant, either directly or indirectly;

A recirculating forced air heating system, said forced air heating system integrated into the envelope, and having an outside air inlet drawing makeup air from the outside environment into the envelop to inflate the envelope and maintain the envelope inflated, an inside air inlet, located within the envelope to draw air from within the micro-environment of the envelope to recirculate, a fan and a heating element located downstream of the outside air inlet and the inside air inlet, heating both air drawn through the outside air inlet and the inside air inlet thereby heating the air within the envelope to a temperature above that of the outside environment, A temperature control system whereas a temperature sensor is placed at a strategic location within the micro-environment that turns that heater on or off as needed to maintain the temperature of the environment to a particular set point or temperature range.

7. The plant protection apparatus as recited in claim 6, wherein said envelope is manufactured from a material having a UV resistance.

8. The plant protection apparatus as recited in claim 6, wherein said envelope is manufactured from a material having mold resistance.

9. The plant protection apparatus as recited in claim 6, and further including a seal that is installed between the drawstring(s) and the plant(s) thereby minimizing leakage.

* * * * *